(12) United States Patent  
Goad et al.

(10) Patent No.: US 8,925,754 B2  
(45) Date of Patent: Jan. 6, 2015

(54) FLOATING TANK BLANKETS AND METHODS FOR CREATING THE SAME ON A SURFACE OF A LIQUID

(71) Applicants: Curtis Goad, Parkville, MO (US); Tyler Goad, Independence, MO (US)

(72) Inventors: Curtis Goad, Parkville, MO (US); Tyler Goad, Independence, MO (US)

(*) Notice: Subject to any disclaimer, the term of this patent is extended or adjusted under 35 U.S.C. 154(b) by 0 days.

(21) Appl. No.: 14/273,055

(22) Filed: May 8, 2014

(65) Prior Publication Data

US 2014/0332457 A1 Nov. 13, 2014

Related U.S. Application Data

(60) Provisional application No. 61/822,676, filed on May 13, 2013, provisional application No. 61/823,586, filed on May 15, 2013.

(51) Int. Cl.
*B01D 29/56* (2006.01)
*B65D 88/34* (2006.01)
*B65D 90/34* (2006.01)

(52) U.S. Cl.
CPC ............. *B01D 29/56* (2013.01); *B65D 88/34* (2013.01); *B65D 90/35* (2013.01)
USPC ...................................................... 220/216

(58) Field of Classification Search
CPC ........ B65D 88/50; B65D 88/42; B65D 88/34; B65D 90/34; B65D 90/32; B01D 29/56; E04H 4/1263

USPC .............. 220/227, 216; 428/36.1; 441/32, 1; 210/167.2, 167.19, 170.05, 242.1, 210/DIG. 9

See application file for complete search history.

(56) References Cited

U.S. PATENT DOCUMENTS

| 3,401,818 | A | * | 9/1968 | Hagen ........................ 220/216 |
| 7,111,497 | B2 | | 9/2006 | Goad et al. |
| 8,133,345 | B2 | | 3/2012 | Goad |
| 2012/0148805 | A1 | | 6/2012 | Goad |

FOREIGN PATENT DOCUMENTS

WO   WO 2011152836 A1 * 12/2011 ............. B65D 90/42

OTHER PUBLICATIONS

Putting a Lid on Tanks; http:/www.kchservices.com/articles/2012/06/putting-a-lid-on-tanks, Jun. 25, 2012, 3 pages.

(Continued)

*Primary Examiner* — Robert J Hicks
(74) *Attorney, Agent, or Firm* — Harness, Dickey & Pierce, P.L.C.

(57) ABSTRACT

A floating tank blanket includes one or more floats. Each float includes upper and lower sheets that are chemically inert and coupled together such that a hollow interior or cavity is defined between the upper and lower sheets. A positively buoyant or floatable filler is within the hollow interior or cavity for imparting or increasing floatation or positive buoyancy. The one or more floats are arrangeable within a tank for covering at least a portion of a surface of a liquid within the tank. The one or more floats allow a part to be immersed into and removed from the liquid in the tank while the one or more floats which remain cover the at least a portion of the surface of the liquid and inhibit fumes from escaping the tank.

16 Claims, 9 Drawing Sheets

(56) References Cited

OTHER PUBLICATIONS

Polypropylene Hollow Balls on CIC Ball Company; http://cicball.thomasnet.com/viewitems/hollow-plastic-balls/polypropylene-hollow-balls? Copyright 2012; 2 pages.

New Source of Hollow Plastic Balls; www/thomasregister.com/orangeproducts; May 2002, 1 page.

Modular Floating Covers for Tanks Ponds and Lagoons, http://www.ieccovers.com/modularFloating.php; Copyright 2013, 1 page.

Hollow Plastic Balls for Industrial Applications, http://www.eccllc.us/applications_advantages.php, Copyright 2007, 2 pages.

Green Coating Techology, http://www.techmetals.com/greentechnology.aspx, Copyright 2009, 6 pages.

Floating Cover Systems, http://www.ieccovers.com/floatingCovers.php, Copyright 2013, 2 pages.

Tank Floats; www.royalvistaplastics.com/polyballs, Royal Vista Plastics, Inc.; printed May 10, 2013; 2 pages.

Polypropylene UFO's; Southwest Plastics, www.southwestplastics.com, printed May 10, 2013; 1 page.

Hollow Plastic Balls, www.techne.com, Techne Incorporated, printed May 10, 2013; 4 pages.

\* cited by examiner

FLOATING TANK BLANKETS AND METHODS FOR CREATING THE SAME ON A SURFACE OF A LIQUID

CROSS-REFERENCE TO RELATED APPLICATIONS

This application claims the benefit of and priority to U.S. Provisional Application No. 61/822,676 filed May 13, 2013 and U.S. Provisional Application No. 61/823,586 filed May 15, 2013. The entire disclosures of the above applications are incorporated herein by reference.

FIELD

The present disclosure generally relates to floating tank blankets, and methods and floats for creating a floating blanket, cover, or barrier on a surface of a liquid, e.g., within a tank, etc.

BACKGROUND

This section provides background information related to the present disclosure which is not necessarily prior art.

Process tanks are commonly used to store contents such as acids, plating chemicals, etc. The size of the tank is not material, but larger process tanks typically hold 1,000 gallons or more. Moreover, process tanks are particularly adaptable for tanks intended for highly corrosive liquids. Examples of process tanks include chromium electroplating and chromium anodizing tanks.

SUMMARY

This section provides a general summary of the disclosure, and is not a comprehensive disclosure of its full scope or all of its features.

According to various aspects, exemplary embodiments are disclosed of floating tank blankets. Also disclosed are exemplary embodiments of methods and floats that may be used for creating a floating blanket, cover, or barrier on a surface of a liquid.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 shows hexagonal or honeycomb shaped floats 100 that may be used to create a floating tank blanket according to an exemplary embodiment. The floats include positively buoyant or floatable fillers within a hollow interior or cavity defined between upper and lower sheets of an outer covering. The upper and lower sheets are sewn or stitched together such as with Teflon® polytetrafluoroethylene (PTFE) coated fiberglass thread, fishing line, etc.

FIGS. 2 and 3 shows various floats having different shapes (e.g., square float 200, rectangular float 300, triangular float 400, etc.) and sizes according to exemplary embodiments. The floats are shown floating in water within a container or bin 201 whereby the floats have created a floating blanket, cover, or barrier on the surface of the water.

Figure 6:
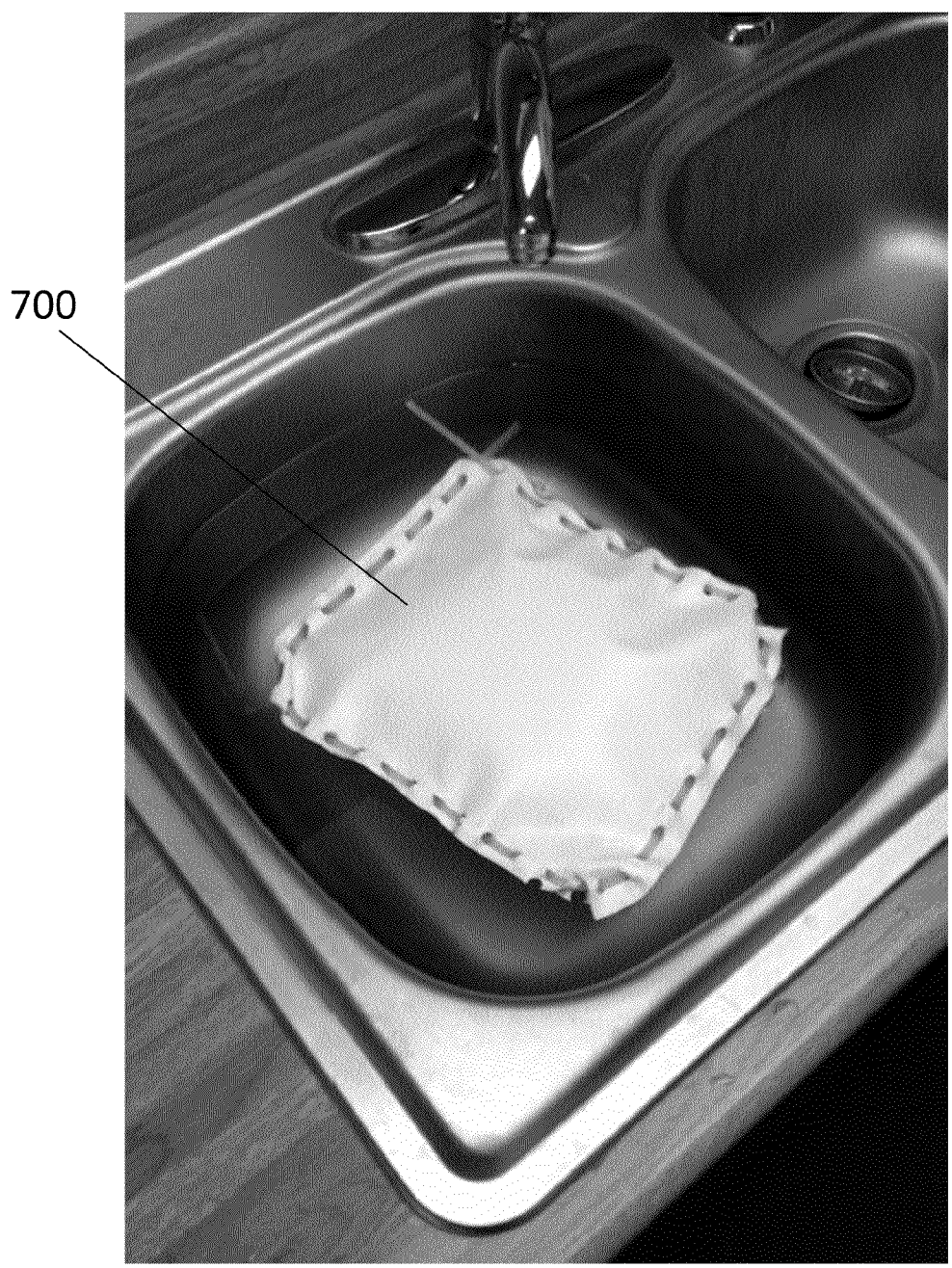
FIG. 6 shows a float 700 according to an exemplary embodiment. The float is shown floating in water within a kitchen sink.
Figure 7:
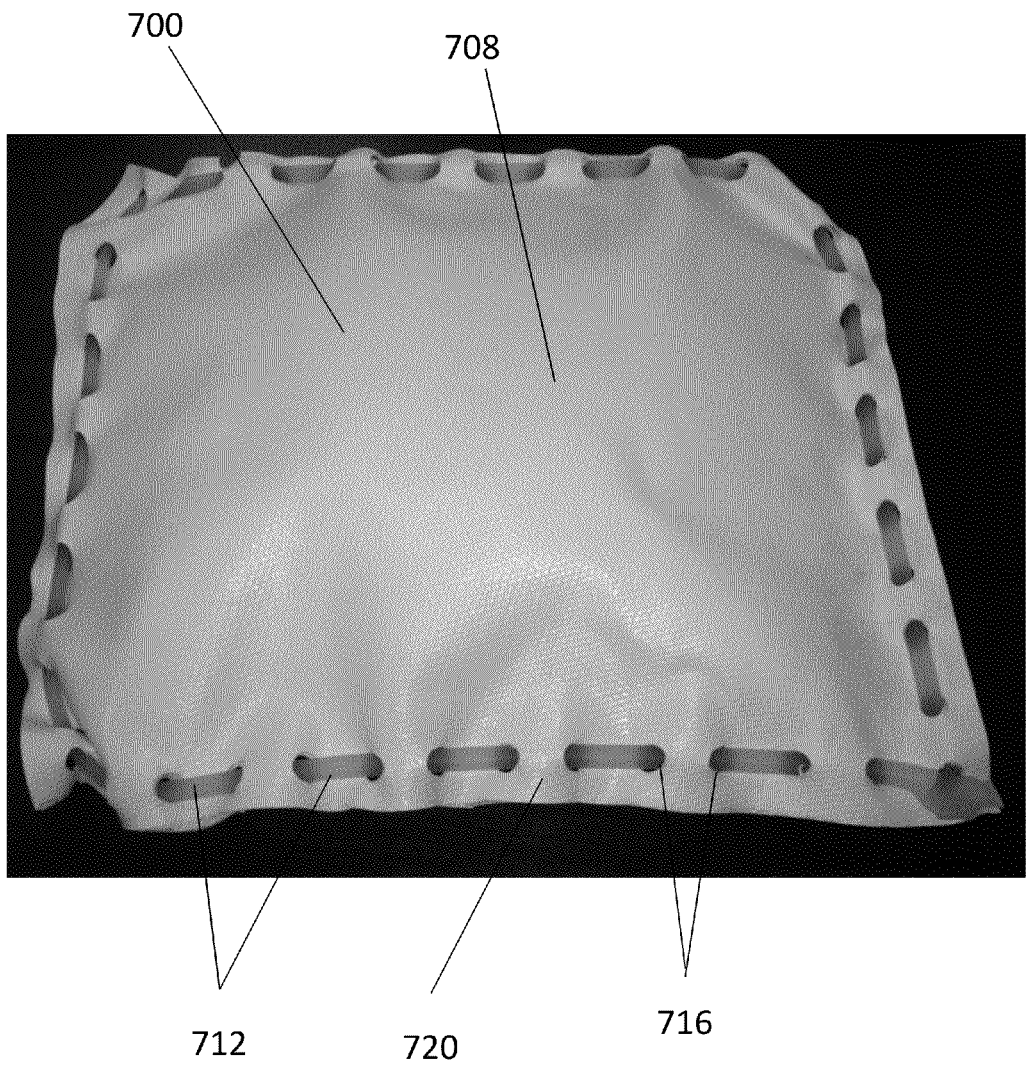

FIG. 7 shows the float 700 of FIG. 6, and also illustrates an example way that the upper and lower sheets of the float's outer covering 708 may be coupled together using tubing 712 (e.g., Kynar® polyvinylidene fluoride (PVDF) tubing, etc.) or other suitable material (e.g., Teflon® PTFE coated fiberglass thread, fishing line, etc.). The tubing or other suitable material is threaded through holes 716 along the edge portions 720 of the float's upper and lower sheets.

Figure 8:
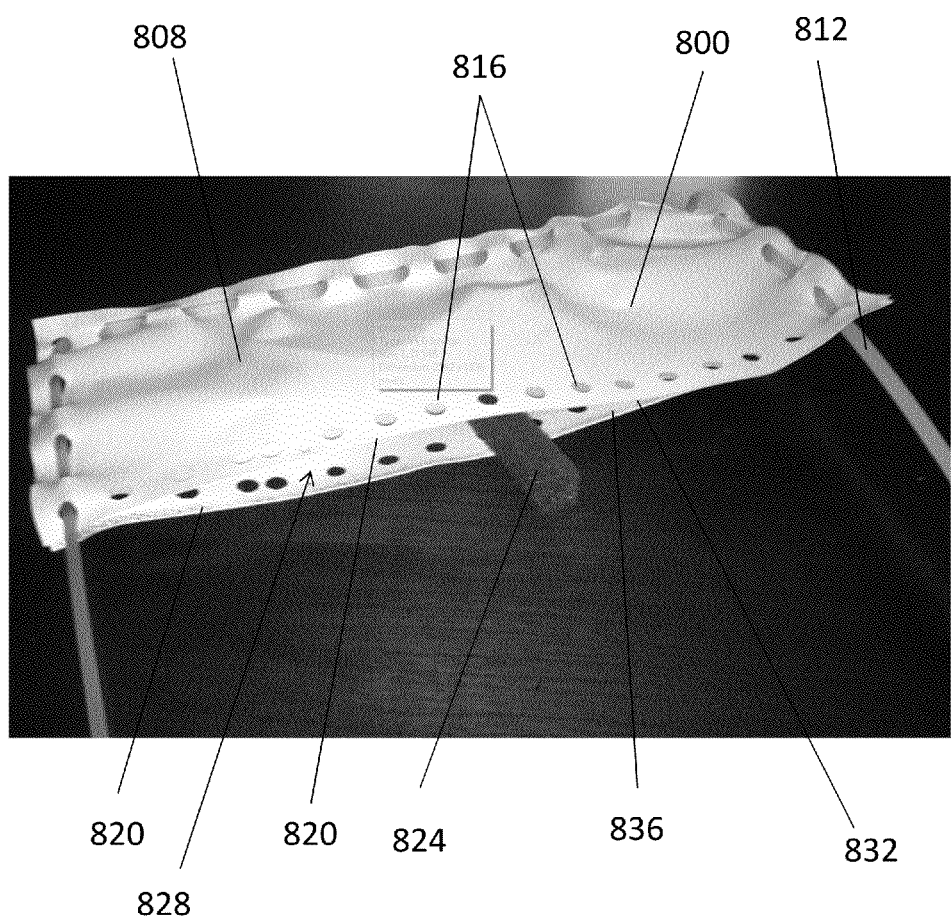

FIG. 8 shows an exemplary embodiment of a float 800, which includes foam 824 as an example filler. The foam is being positioned within a hollow interior or cavity 828 defined between upper and lower sheets 832, 836 of the float's outer covering 808 before the edge portions 820 of the float's upper and lower sheets are coupled together via tubing 812 threaded through holes 816.

Figure 9:

FIG. 9 shows examples of rectangular foam pieces 924 and foam packaging peanuts 1024 that may be used as a positively buoyant or floatable filler within floats according to exemplary embodiments. The filler may be positioned directly within a hollow interior or cavity defined between the float's upper and lower sheets. Or, for example, the filler may first be positioned in a sealable container (e.g., zippered bag 1140, etc.). Then, the sealable container with the filler therein may be positioned within the hollow interior or cavity.

Corresponding reference numerals indicate corresponding parts throughout the several views of the drawings.

DETAILED DESCRIPTION

Example embodiments will now be described more fully with reference to the accompanying drawings.

The inventors hereof have recognized several drawbacks associated with the use of conventional hollow plastic balls to create a floating tank blanket on the surface of a liquid within a tank. For example, it is very common for some of the hollow plastic balls to be dragged or pulled out of the liquid upon removal of a machine immersed in the liquid. As another example, the balls are oftentimes too tempting for workers to resist removing the balls from the tank and tossing them at each other. The hollow plastic balls may also be prone to cracking and then sinking to the bottom of the tank.

Accordingly, the inventors have developed and disclose herein exemplary embodiments of floating tank blankets. Also disclosed are exemplary embodiments of methods and floats that may be used for creating a floating blanket, cover, or barrier on a surface of a liquid, such as a liquid within a process tank, etc. In use, the floating blanket, cover, or barrier created by one or more floats may provide various advantages, such as a reduction of vapor emissions or fumes (e.g., hazardous air pollutant emissions, etc.) that might otherwise be discharged by the liquid if left uncovered. For example, the floating blanket, cover, or barrier created by the floats may be used to reduce chromium emissions from chromium electroplating and chromium anodizing tanks, thereby eliminating or reducing the need for perfluorooctane sulfonic acid fume suppressants. Other advantages that may be realized with exemplary embodiments disclosed herein include a cost effective and maintenance free way of conserving expensive chemicals and reducing or controlling: heat loss for heated liquids, cold loss for cooled liquids, evaporation, dragout, microbial growth, odors, splashing and condensation, energy costs, exhaust maintenance, exhaust capacity, and makeup air requirements.

In exemplary embodiments, one or more floats (e.g., FIGS. 1 through 8, etc.) may be used to create a floating blanket, cover, or barrier on a surface of a liquid. As disclosed herein, a float may include a positively buoyant or floatable filler (e.g., FIGS. 8 and 9, etc.) within a hollow interior or cavity that is defined by or between upper and lower sheets of an outer covering. The upper and lower sheets are coupled together along their overlapping edge portions.

The edge portions of the upper sheet may be coupled to corresponding edge portions of the lower sheet in a variety of ways, such as welding (e.g., radio frequency welded, extrusion welded, etc.), sewing, stitching, adhesive bonding, heat sealing, etc. In some exemplary embodiments, the edge portions are coupled to each other such that a watertight seal is formed that prevents water or other liquids from penetrating into the interior of the float. By way of example, FIGS. 1 through 5 show various examples of floats 100, 200, 300, 400, 500, and 600 according to exemplary embodiments in which edge portions of the upper and lower sheets are sewn together e.g., using Teflon® polytetrafluoroethylene (PTFE) coated fiberglass thread, etc. FIGS. 6 and 7 illustrate another example way that the upper and lower sheets may be coupled together using tubing 712 (FIG. 7) (e.g., Kynar® polyvinylidene fluoride (PVDF) tubing, etc.) that is threaded through holes 716 along the edge portions 720 of the upper and lower sheets of the outer coating 708.

The upper and lower sheets may be formed from a wide range of materials, which are preferably chemically inert materials. In an exemplary embodiment, the upper and lower sheets comprise Teflon® PTFE sheets having a thickness of about 20 mils and a width and/or length of about 8 inches or 12 inches. The Teflon® PTFE sheets generally do not float in liquids, such as water. Hence, there is a need for the positively buoyant or floatable filler to increase or impart sufficient positive buoyancy or floatation. In alternative embodiments, a float may be made from other materials and/or with different dimensions. For example, other exemplary embodiments may include the upper and/or lower sheets that are formed from mesh, perforated sheets, cheesecloth, filtration media, expanded Teflon sheets having openings therein, high density polyethylene (HDPE), polymer, etc. The upper and lower sheets may be made out of the same material, or they may be made out of different materials.

In an exemplary embodiment, the upper and lower sheets have openings therein that are sufficiently large enough to allow hydrogen gas bubbles to pass therethrough. When the floats are positioned, for example, in a chromium electroplating and chromium anodizing tank, hydrogen gas bubbles traveling upwards through the chromium will pass through the openings in the lower sheet. The bubbles within then contact the positively buoyant or floatable filler (e.g., closed-cell foam, etc.) in the float. This, in turn, will cause the bubbles to burst, thereby releasing the hydrogen gas which will then pass through the openings in the upper sheet. Because the bubbles are trapped and burst within the interior of the float, droplets are not ejected or emitted into the air when the bubbles burst. This, in turn, advantageously reduces chromium emissions from the tank.

In some embodiments, the upper and lower sheets may be identical with the same pattern, size, shape, etc. of openings. In other embodiments, the upper and lower sheet may be configured differently, e.g., made from different materials and/or have different patterns, sizes, and/or shapes of openings, etc. For example, the lower sheet may have openings large enough to allow bubbles to pass therethrough. The upper sheet may have smaller openings that will not allow the bubbles to pass therethrough but will allow hydrogen gas to pass therethrough. The bubbles will thus be trapped within the interior of the float as the upper and lower sheets are configured to allow one way permeation of the bubbles through the lower sheet but not the upper sheet.

In some embodiments, the upper and lower sheets may comprise upper and lower portions of a closable case. For example, a plastic case may be used that has upper and lower portions hinged connected and that may be latched, snapped, or otherwise held in the closed position. In this example, the plastic case is filled with the filler (e.g., closed-cell foam, etc.) and then closed before it is added to a tank. In another exemplary embodiment, the upper and lower sheets comprise chemically inert mesh or other perforated material attached to the frame, such as a hexagonal plastic frame, etc.

Figure 5:
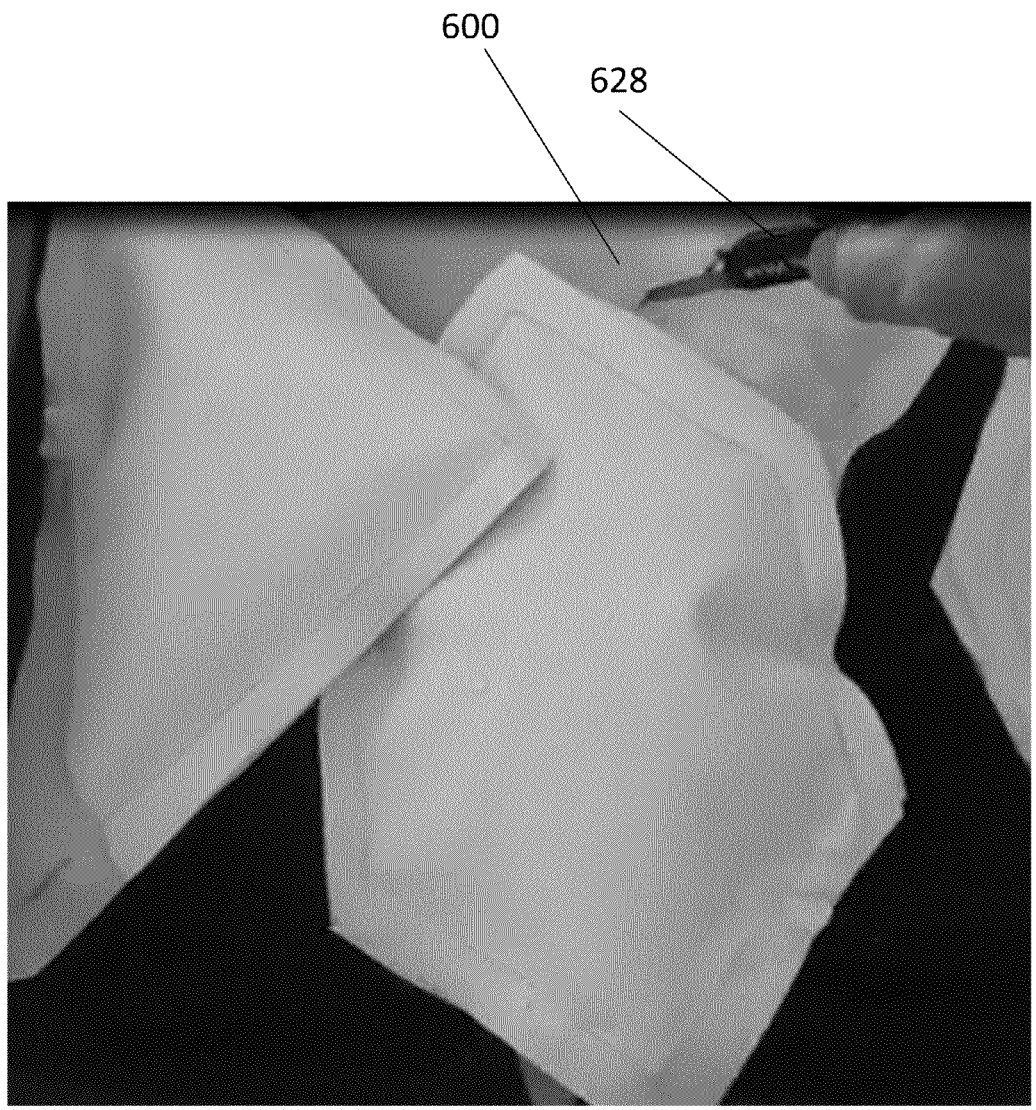
FIG. 5 shows a knife 628 pushing against a float 600 without puncturing the float to demonstrate how the float may be configured (e.g., sufficiently puncture resistant outer sheets, etc.) to be puncture resistant or puncture proof by sharp objects.

The upper and lower sheets are preferably durable and tough, e.g., sufficiently resistant to puncture, etc. For example, FIG. 5 shows an exemplary embodiment of a float 600 that has upper and lower sheets that are sufficiently puncture resistant and will sink or be pushed under the water when contacted by a sharp object like a knife 628, such that the sharp object doesn't puncture the float which would then allow liquid to flow therein. The upper and lower sheets may be able to withstand sunlight and/or be thermally insulative, such that the floating blanket provides an effective thermal insulation barrier too.

The positively buoyant or floatable filler may also be formed from a wide range of materials. The filler is floatable or positively buoyant in the liquid in which the float will be used. The particular filler selected will have a specific gravity less than the specific gravity of water or other liquid in which the float will be used. In an exemplary embodiment, the positively buoyant or floatable filler comprises polyvinylidene fluoride (PVDF) closed-cell foam, such as Kynar® PVDF closed-cell foam, etc. In another exemplary embodiment, the positively buoyant or floatable filler comprises rectangular foam pieces 924 or foam packaging peanuts 1024 as show in FIG. 9. In alternative embodiments, a float may include other filler materials, e.g., hollow plastic balls, floating pellets, etc.

In some embodiments, the positively buoyant or floatable filler is chemically inert or nonreactive. But in other embodiments, the positively buoyant or floatable filler is not chemically inert and is instead chemically reactive.

The particular type and amount of filler(s) used may vary, depending, for example, on the particular type of liquid in which the float(s) will be used. For example, a chemically inert filler or chemically inert outer covering is not necessarily required if the float(s) will be used with water. Also, the amount of filler needed to provide positive buoyancy or floatability to the float(s) will depend on the specific gravity of the liquid in which the float will be used. The amount of filler may be kept low so that the float has a generally low profile to better withstand wind and/or to save on material costs.

In some exemplary embodiments, the filler may be positioned directly within a hollow interior or cavity defined between upper and lower sheets of an outer covering. For example, FIG. 8 shows an exemplary embodiment of a float 800, which includes foam 824 as an example filler. The foam is being positioned within a hollow interior or cavity 828 defined between upper and lower sheets 832, 836 of the float's outer covering 808 before the edge portions 820 of the float's upper and lower sheets are coupled together via tubing 812 threaded through holes 816.

In other embodiments, the filler may first be positioned in a sealable container and then the sealable container with the filler therein may be positioned within the hollow interior or cavity. For example, FIG. 9 shows examples of rectangular foam pieces 924 and foam packaging peanuts 1024 that may be used as a positively buoyant or floatable filler within floats according to exemplary embodiments. The filler may be positioned directly within a hollow interior or cavity defined between the float's upper and lower sheets. Or, for example, the filler may first be positioned in a sealable container, e.g., zippered bag 1140, etc. Then, the sealable container with the filler therein may be positioned within the hollow interior or cavity. In these latter embodiments, the sealable container may be chemically inert, for example, to provide an extra layer of protection if chemically reactive filler is used. With the outer chemically inert covering and an inner chemically inert container, chemically reactive fillers may be preferred due to their lower costs as compared to chemically inert materials.

In some exemplary embodiments, the float may have interior partitions, walls, baffles, or dividers within the hollow interior or cavity defined between the upper and lower sheets of outer covering. These dividers may help keep the filler (e.g., pieces of foam, etc.) more evenly distributed within the float, for example, to help stop the filler from accumulating at an end of the float if it is stored on its edge. But these dividers are not required as the float is configured so that it will float and remain generally horizontally with the two sheets respectively facing upwards and downwards, whereby the filler would not accumulate at either end.

Figure 1:
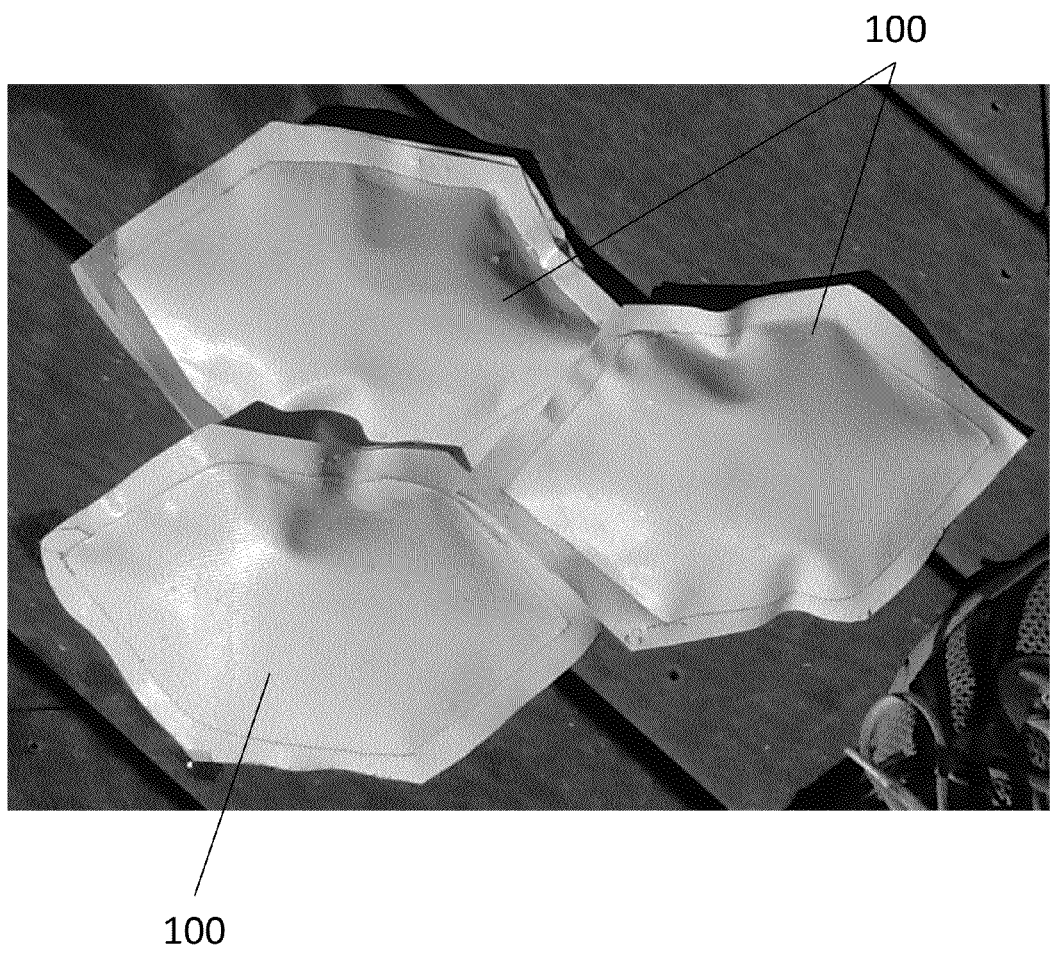
Figure 2:
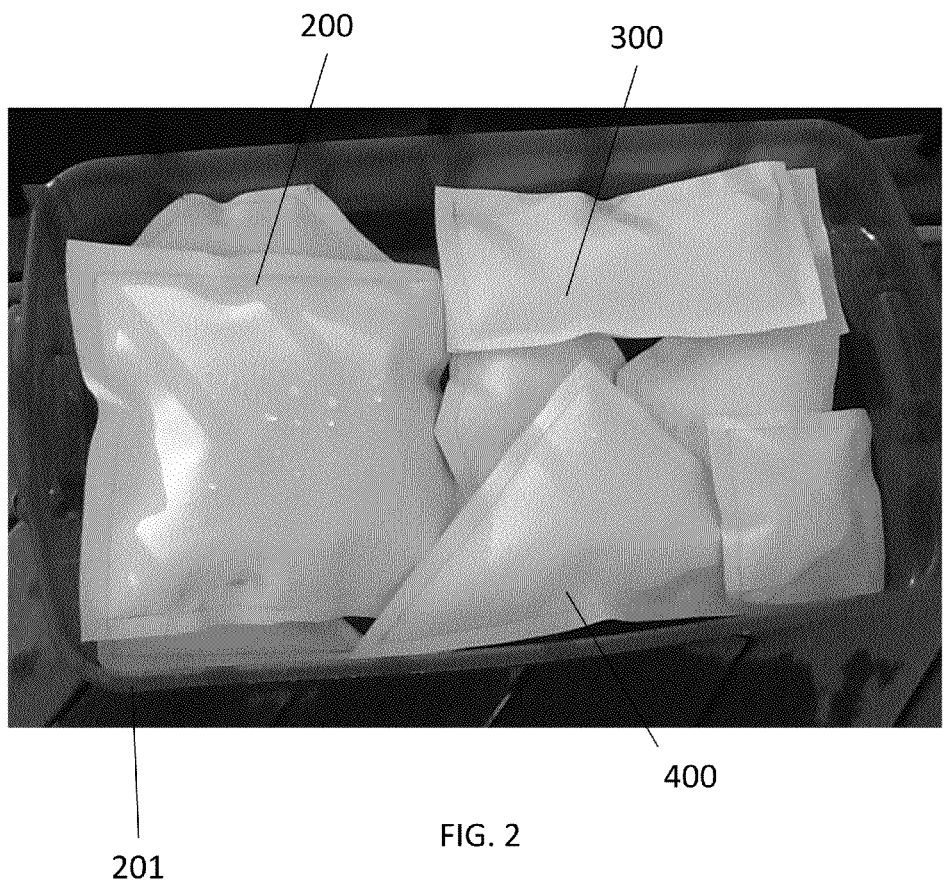
Figure 3:
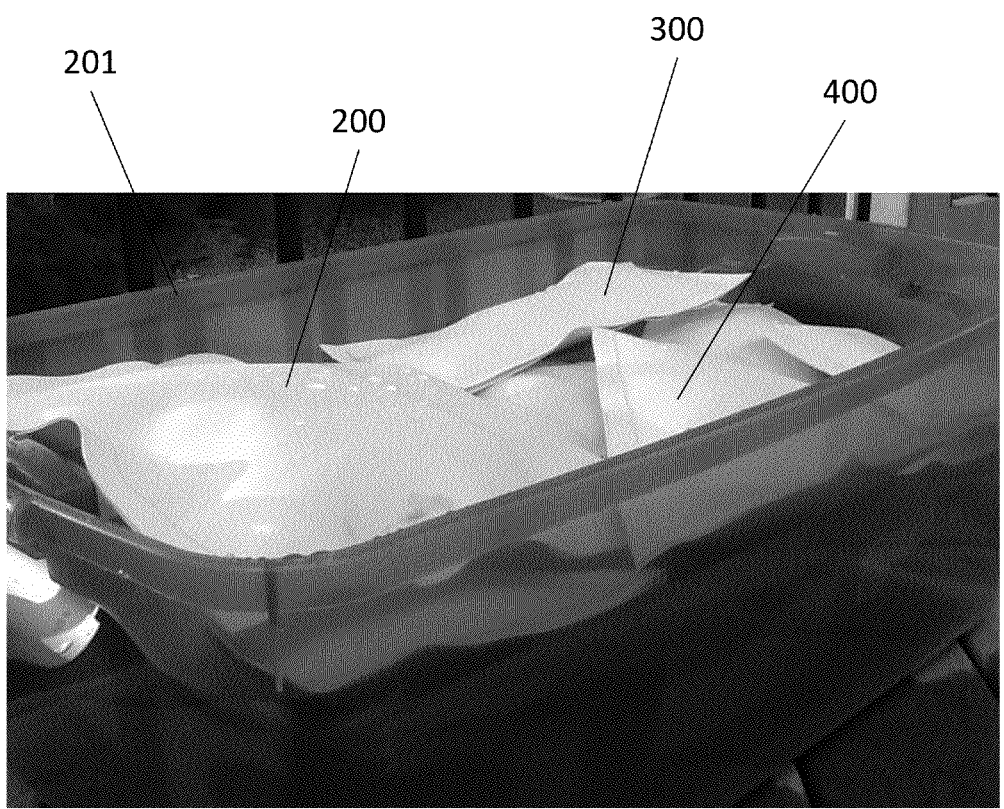
Figure 4:
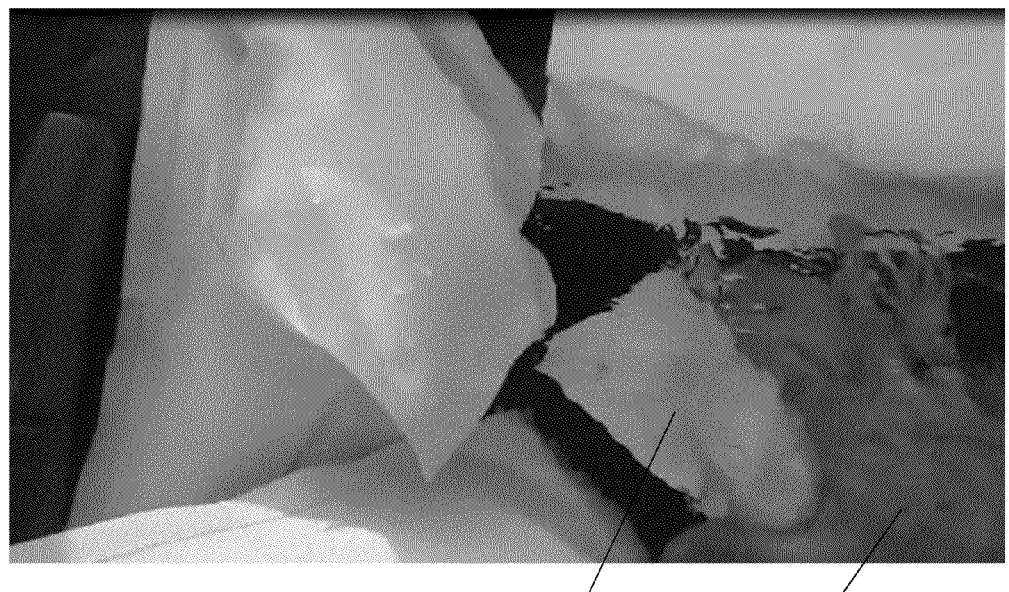
FIG. 4 shows a float 500 being pushed under the water and out of the way. The hand 524 is representative of a machine being placed into the water to demonstrate how the floats allow a machine to be placed into the water without having to remove the floats.

The size and shape of the float(s) used to create a floating blanket, cover, or barrier on a surface of a liquid may vary depending on, for example, the particular liquid, tank size, tank shape, etc. By way of example, FIG. 1 shows three hexagonal or honeycomb shaped floats 100 that may be used to create a floating tank blanket according to an exemplary embodiment. The hexagon or honeycomb shaped float 100 may provide excellent or maximum top surface coverage, e.g., more than 90% coverage of the liquid surface. By way of further example, FIG. 2 shows square floats 200, rectangular floats 300, and triangular floats 400 that are creating a floating blanket on the surface of water in the plastic container 201 according to an exemplary embodiment. Accordingly, a floating tank blanket may be created using a plurality of floats 100 all having the same size and shape as shown in FIG. 1. Or, a floating tank blanket may be created using a plurality of floats 200, 300, 400 that do not all have the same shape and size as shown in FIG. 2.

By way of further example, the outer covering or shell may be made from rigid polyvinylchloride, chlorinated polyvinyl chloride (CPVC), polyethylene, polypropylene, copolymer polypropylene, polyvinylidene fluoride (PVDF) (e.g., Kynar® PVDF, etc.), etc. Electrically-conductive material may be disposed between the upper and lower sheets, such that the electrically-conductive material with a ground connection allows for leak detection, permeation monitoring, and/or spark testing. The outer covering or shell has a ground connection to allow for leak detection, permeation monitoring, DC spark testing, etc. In alternative embodiments, other suitable electrically-conductive means (e.g., electrically-conductive adhesive cement, metal foil, metal drywall corner bead, etc.) may be used between a liner and a frame to allow pre-leak testing such as high frequency "spark" testing and/or by a testing method disclosed in U.S. Pat. No. 7,111,497, U.S. Pat. No. 8,133,345, and/or U.S. Patent Application Publication US2012/0148805, the entire contents of which are incorporated herein by reference.

The exemplary floats disclosed herein may be used alone or in combination with other floatation devices. For example, conventional hollow plastic balls and the exemplary floats disclosed herein may be used in combination to create a floating cover on the surface of a liquid. As another example, an exemplary embodiment of a float may comprise hollow (e.g., polypropylene, plastic, etc.) balls that are within the interior defined between upper and lower sheets (e.g., polytetrafluoroethylene (PTFE), etc.). Because the balls are enclosed within the interior of the float, the drawbacks described above for conventional hollow plastic balls may be avoided.

In some exemplary embodiments, the floats are sufficiently large (e.g., larger than conventional hollow plastic balls, etc.) such that they won't be dragged or pulled out of the tank upon removal of a machine immersed in the liquid in the tank. Also in some exemplary embodiments, the floats may also be sized large enough so as to prevent the floats from being sucked into a drain or filter of the tank in which they will be used.

In some exemplary embodiments, a floating blanket, cover, or barrier on a surface of a liquid is provide by using a single foam sheet or several pieces of foam sheet, e.g., polyvinylidene fluoride (PVDF) closed-cell foam, etc. In an exemplary embodiment, one or more pieces or sheets of Kynar® PVDF closed-cell foam are used for creating a floating blanket, cover, or barrier on a surface of a liquid. The one or sheets of foam may float on a liquid at the top of a tank and also create a seal along the edge of the tank between the one or more sheets of foam and the tank wall.

Rather than having multiple floats or pillows randomly floating on the liquid in the tank (e.g., acid in a process tank, etc.), some embodiments include one or more sheets or pillows of foam that are anchored (e.g., fusion welded, etc.) to the tank's side walls. The one or more sheets of foam may be configured to have or leave an opening or open slot at about the middle of the tank to allow a part to be (e.g., periscopically, etc.) immersed into and removed from the liquid in the tank while the one or more sheets of foam remain in place covering the tank and inhibiting fumes from escaping the tank. For example, a carrier may move the part downwardly into and upwardly out of the liquid in the tank (e.g., with a similar movement to a periscope, etc.). The floating tank blanket doesn't move or shift significantly though it may move near or at the opening as the part moves into and out of the tank through the opening.

In an exemplary embodiment, a single sheet or piece of Kynar® PVDF closed-cell foam includes an opening at about the middle or other suitable location. The edge portions of the Kynar® PVDF closed-cell foam is fusion welded or anchored to the tank sidewalls, to thereby provide a floating blanket, cover, or barrier on a surface of a liquid within the tank. A seal along the edge of the tank is provided between the Kynar® PVDF closed-cell foam and the tank sidewalls. A part may be moved (e.g., periscopically, etc.) through the opening in the Kynar® PVDF closed-cell foam to be immersed into and removed from the liquid in the tank. As the part is moved through the opening, the Kynar® PVDF closed-cell foam remains in place covering the tank and inhibiting fumes from escaping the tank. The Kynar® PVDF closed-cell foam doesn't move or shift significantly though it may move near or at the opening as the part moves into and out of the tank through the opening in the Kynar® PVDF closed-cell foam. Other embodiments may include more than a single sheet or piece of Kynar® PVDF closed-cell foam for creating a floating blanket, cover, or barrier on a surface of a liquid within the tank.

Accordingly, the inventors have developed and disclose herein exemplary embodiments of floating tank blankets. Also disclosed are exemplary embodiments of methods and floats that may be used for creating a floating blanket, cover, or barrier on a surface of a liquid. In use, the floating blanket, cover, or barrier created by the inventors' floats may provide various advantages, such as a reduction of mist, vapor emissions, or fumes (e.g., hazardous air pollutant emissions, etc.) that might otherwise be discharged by the liquid if left uncovered. For example, the floating blanket, cover, or barrier created by the floats may be used to reduce chromium emissions from chromium electroplating and chromium anodizing tanks, thereby eliminating or reducing the need for perfluorooctane sulfonic acid fume suppressants. Other advantages that may be realized with exemplary embodiments disclosed herein include a cost effective and maintenance free way of conserving expensive chemicals and reducing or controlling: heat loss for heated liquids, cold loss for cooled liquids, evaporation, dragout, microbial growth, odors, splashing and condensation, energy costs, exhaust maintenance, exhaust capacity and makeup air requirements.

With a sufficient quantity of the inventors' floats on a surface of a liquid, the floats will automatically arrange themselves into a close packed formation, e.g., with over 90% of the surface area covered. The floating blanket helps to block sunlight from penetrating the water, which helps to reduce algae growth. The individual floats are relatively light and easily handled thereby allowing a cover to be easily added retroactively or retrofitted to tanks. For example, a plurality of individual floats may be added to a really large (e.g., 20 foot long, etc.) open or uncovered tank to create a floating tank blanket therein on the surface of the liquid held within the tank. Notably, the individual floats are much lighter and easier to handle than would a single piece cover for the same large tank due to the large size and heavy weight of that single piece cover.

Exemplary embodiments of the inventors' apparatus and methods may be used with various types of liquids, for various types of applications, and/or with anything (e.g., tanks, basins, ponds, lagoons, etc.) that may hold liquid. For example, exemplary embodiments may be used with various types of tanks, including tanks intended for different uses, different sizes and shapes, formed from different materials (e.g., steel, fiberglass, rubber, lead, plastic, wood, recycled composite wood, etc.), different types of tanks (e.g., process tanks, indoor or outdoor containment pits, other storage or liquid containment vessels, etc.), etc. Exemplary embodiments may be used with various types of chemicals, chromium, acids, petroleum, etc. Exemplary embodiments may be used for various types of applications, such as sewage treatment, chemical storage, laboratories, refineries (e.g., petroleum refineries, copper refineries, etc.), acid pickling, municipal drinking water, chromium electroplating and anodizing, etc. Accordingly, aspects of the present disclosure should not be limited to use with any one particular type of liquid, tank, or application.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally," "about," and "substantially," may be used herein to mean within manufacturing tolerances. Or, for example, the term "about" as used herein when modifying a quantity of an ingredient or reactant of the invention or employed refers to variation in the numerical quantity that can happen through typical measuring and handling procedures used, for example, when making concentrates or solutions in the real world through inadvertent error in these procedures; through differences in the manufacture, source, or purity of the ingredients employed to make the compositions or carry out the methods; and the like. The term "about" also encompasses amounts that differ due to different equilibrium conditions for a composition resulting from a particular initial mixture. Whether or not modified by the term "about," the claims include equivalents to the quantities.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A floating tank blanket comprising one or more floats, each said float including:
    upper and lower sheets that are chemically inert and coupled together and defining a hollow interior or cavity between the upper and lower sheets;
    a positively buoyant or floatable filler within the hollow interior or cavity for imparting or increasing floatation or positive buoyancy;
    whereby the one or more floats are arrangeable within a tank for covering at least a portion of a surface of a liquid within the tank; and
    whereby the one or more floats allow a part to be immersed into and removed from the liquid in the tank while the one or more floats which remain cover the at least a portion of the surface of the liquid and inhibit fumes from escaping the tank.

2. The floating tank blanket of claim 1, wherein the upper and lower sheets comprise mesh, perforated sheets, and/or filtration media.

3. The floating tank blanket of claim 1, wherein the upper and lower sheets have openings therein.

4. The floating tank blanket of claim 1, wherein:
    the lower sheet has openings configured to allow hydrogen gas bubbles to pass therethrough; and
    the upper sheet has openings therein configured to allow hydrogen gas to pass therethrough but not hydrogen gas bubbles.

5. The floating tank blanket of claim 4, wherein the openings of the upper and lower sheets are configured such that hydrogen gas bubbles will pass through the openings in the lower sheet and contact the positively buoyant or floatable filler, thereby causing the hydrogen gas bubbles to burst and release hydrogen gas that passes through the openings in the upper sheet, whereby chromium emissions from the tank will be reduced.

6. The floating tank blanket of claim 1, wherein the one or more floats comprise a sufficient number of floats such that the floats automatically arrange themselves into a close packed formation on the surface and over 90% of the liquid surface area is covered.

7. The floating tank blanket of claim 1, wherein the positively buoyant or floatable filler is chemically inert.

8. The floating tank blanket of claim 1, wherein the upper and lower sheets comprise polytetrafluoroethylene (PTFE).

9. The floating tank blanket of claim 1, wherein the upper and lower sheets are coupled together along overlapping edge portions.

10. The floating tank blanket of claim 9, wherein:
    the overlapping edge portions of the upper and lower sheets are coupled to each other by welding, sewing, stitching, adhesive bonding, and/or heat sealing; and/or
    the overlapping edge portions of the upper and lower sheets are coupled to each other such that a watertight seal is formed that prevents water or other liquids from penetrating into the interior of the hollow interior or cavity between the upper and lower sheets; and/or
    the overlapping edge portions of the upper and lower sheets are sewn together using polytetrafluoroethylene (PTFE) coated fiberglass thread or coupled together using polyvinylidene fluoride (PVDF) tubing that is threaded through holes along the overlapping edge portions of the upper and lower sheets.

11. The floating tank blanket of claim 1, wherein the positively buoyant or floatable filler comprises polyvinylidene fluoride (PVDF) closed-cell foam.

12. The floating tank blanket of claim 1, wherein:
the positively buoyant or floatable filler is positioned in a sealable chemically inert container; and
the sealable container with the positively buoyant or floatable filler therein is positioned within the hollow interior or cavity.

13. The floating tank blanket of claim 12, wherein:
the sealable container comprises a zippered bag; and
the positively buoyant or floatable filler is not chemically inert.

14. A method of creating the floating tank blanket of claim 1, the method comprising positioning the one or more floats within the tank, such that the one or more floats allow a part to be immersed into and removed from a liquid within the tank while the one or more floats which remain in place cover at least a portion of a surface of a liquid within the tank and inhibit fumes from escaping the tank.

15. The method of claim 14, wherein the method includes positioning a sufficient number of the one or more floats within the tank such that the one or more floats automatically arrange themselves into a close packed formation that covers over 90% of the surface of the liquid.

16. The method of claim 14, wherein the method includes positioning the one or more floats in a chromium electroplating and/or chromium anodizing tank to reduce chromium emissions.

* * * * *